US012199360B2

(12) United States Patent
Ikeda et al.

(10) Patent No.: US 12,199,360 B2
(45) Date of Patent: Jan. 14, 2025

(54) ANTENNA DEVICE

(71) Applicant: MITSUBISHI ELECTRIC CORPORATION, Tokyo (JP)

(72) Inventors: Shunichi Ikeda, Tokyo (JP); Kei Yokokawa, Tokyo (JP); Narihiro Nakamoto, Tokyo (JP); Akihito Hirai, Tokyo (JP); Toru Fukasawa, Tokyo (JP); Masataka Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 148 days.

(21) Appl. No.: 18/124,867

(22) Filed: Mar. 22, 2023

(65) Prior Publication Data

US 2023/0223694 A1 Jul. 13, 2023

Related U.S. Application Data

(63) Continuation of application No. PCT/JP2020/047405, filed on Dec. 18, 2020.

(51) Int. Cl.
*H01Q 9/04* (2006.01)
*H01Q 21/26* (2006.01)

(52) U.S. Cl.
CPC ........... *H01Q 9/0407* (2013.01); *H01Q 21/26* (2013.01)

(58) Field of Classification Search
CPC .... H01Q 9/0407; H01Q 21/26; H01Q 9/0421; H01Q 23/00
See application file for complete search history.

(56) References Cited

U.S. PATENT DOCUMENTS

2014/0225795 A1 8/2014 Yu
2014/0266959 A1* 9/2014 Xue .......................... H01Q 1/48 343/848

FOREIGN PATENT DOCUMENTS

CN 109273837 A 1/2019
JP 2001-339239 A 12/2001
JP 2004-201145 A 7/2004
JP 3995206 B2 10/2007

OTHER PUBLICATIONS

Extended European Search Report for European Application No. 20966000.0, dated Nov. 14, 2023.
Machine translation of JP-2004-201145-A, published on Jul. 15, 2004.
European Communication pursuant to Article 94(3) EPC for European Application No. 20 966 000.0, dated Aug. 5, 2024.

* cited by examiner

*Primary Examiner* — Dieu Hien T Duong
(74) *Attorney, Agent, or Firm* — Birch, Stewart, Kolasch & Birch, LLP

(57) ABSTRACT

An antenna device includes: a patch conductor provided on a substrate; a GND conductor provided in the substrate in such a manner as to face the patch conductor; GND pins that are provided in the substrate and that connect the patch conductor and the GND conductor; and an RF circuit provided on a first face of the patch conductor opposite to a second face of the patch conductor, the second face being attached to the substrate, the RF circuit being provided in such a manner as to be surrounded by the GND pins.

7 Claims, 6 Drawing Sheets

ANTENNA DEVICE

CROSS REFERENCE TO RELATED APPLICATIONS

This application is a Continuation of PCT International Application No. PCT/JP2020/047405, filed on Dec. 18, 2020, which is hereby expressly incorporated by reference into the present application.

TECHNICAL FIELD

The present disclosure relates to an antenna device.

BACKGROUND ART

In some antenna devices, components of an RF circuit are installed inside an antenna unit. Such a conventional antenna device is disclosed in, for example, Patent Literature 1.

CITATION LIST

Patent Literature

Patent Literature 1: JP 2001-339239 A

SUMMARY OF INVENTION

Technical Problem

In the antenna device disclosed in Patent Literature 1, components of an RF circuit are provided in a space inside an annular patch antenna including a patch conductor and a GND conductor. For this reason, in the antenna device disclosed in Patent Literature 1, the patch conductor and the GND conductor are larger than necessary, which may lead to an increase in size of the device.

The present disclosure has been made to solve the above problem, and an object of the present disclosure is to provide an antenna device that does not require a space for installing an RF circuit in the space inside the patch antenna, so that the size of the device can be reduced.

Solution to Problem

An antenna device according to the present disclosure includes: a patch conductor provided on a substrate; a GND conductor provided in the substrate in such a manner as to face the patch conductor; GND pins that are provided in the substrate and that connect the patch conductor and the GND conductor; and an RF circuit provided on a first face of the patch conductor opposite to a second face of the patch conductor, the second face being attached to the substrate, the RF circuit being provided in such a manner as to be surrounded by the GND pins.

Advantageous Effects of Invention

According to the present disclosure, with the above configuration, it is possible to downsize the device since a space for installing an RF circuit is not required in a space inside a patch antenna.

DESCRIPTION OF EMBODIMENTS

To describe the present disclosure further in detail, embodiments for carrying out the present disclosure will be described below with reference to the accompanying drawings.

First Embodiment

Figure 1:
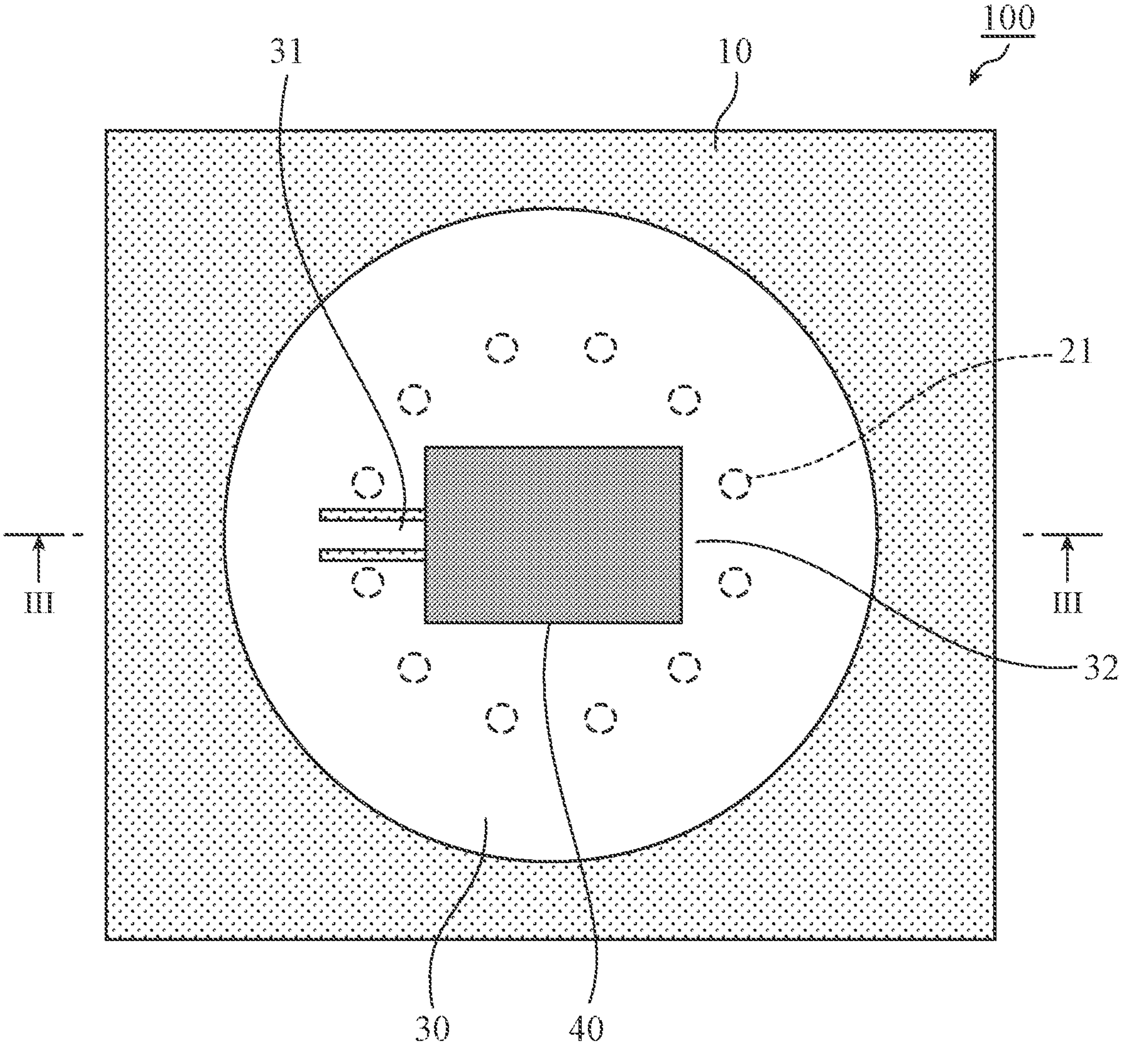
FIG. 1 is a plan view illustrating a configuration of an antenna device according to a first embodiment.
Figure 2:
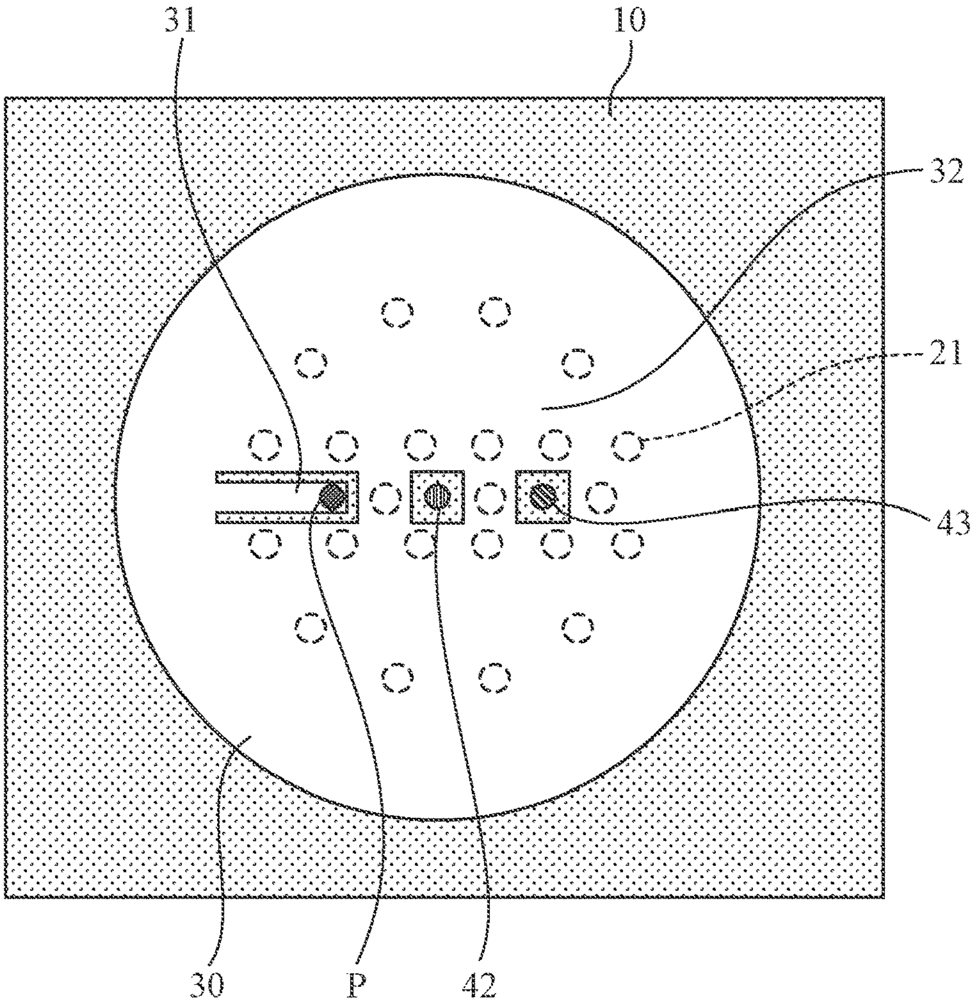
FIG. 2 is a plan view illustrating a state in which an RF circuit is removed from the antenna device.
Figure 3:
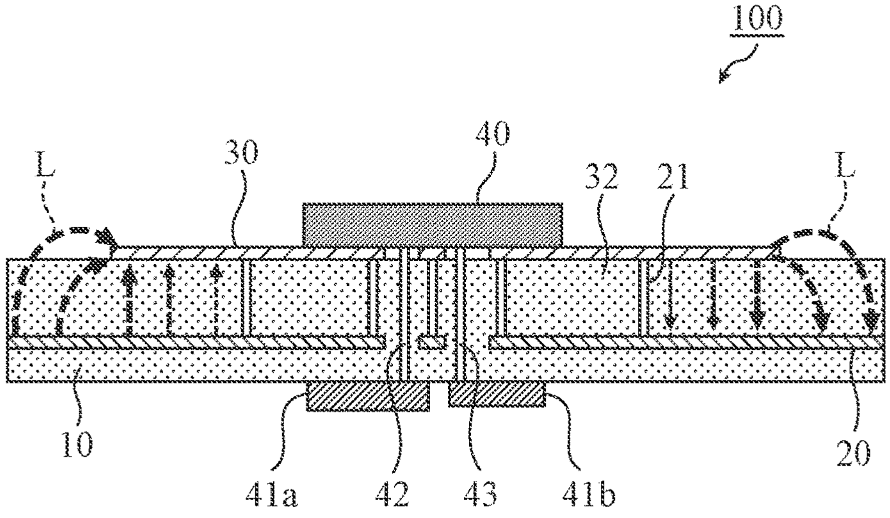
FIG. 3 is a cross-sectional view viewed along arrows in FIG. 1.

An antenna device 100 according to a first embodiment will be described with reference to FIGS. 1 to 3. FIG. 1 is a plan view illustrating the configuration of the antenna device 100 according to the first embodiment. FIG. 2 is a plan view illustrating a state in which an RF circuit 40 is removed from the antenna device 100. FIG. 3 is a cross-sectional view viewed along arrows in FIG. 1.

The antenna device 100 includes a substrate 10, a GND conductor 20, GND pins 21, a patch conductor 30, a coplanar line 31, an RF circuit 40, mounted components **41*a* and 41*b*, a signal line 42, and a power supply line 43**.

The substrate 10 is formed of an insulating material such as resin, ceramic, or a hybrid material obtained by combining resin and ceramic. The substrate 10 has a rectangular shape in plan view and has a predetermined thickness.

The GND conductor 20 is provided inside the substrate 10. The GND conductor 20 is provided between the top face of the substrate 10 and the lower face of the substrate 10. The GND conductor 20 is formed into a flat plate shape and has a size substantially equal to the size of the substrate 10.

The patch conductor 30 is provided on the top face of the substrate 10. That is, the lower face of the patch conductor 30 is attached to the top face of the substrate 10. The patch conductor 30 has, for example, a circular shape. The patch conductor 30 is provided in such a manner as to face the GND conductor 20.

The plurality of GND pins 21 is provided inside the substrate 10. These GND pins 21 connect the GND conductor 20 and the patch conductor 30.

The coplanar line 31 is a conductor region surrounded by linear slits on three sides thereof in the patch conductor 30. In this manner, the coplanar line 31 is linearly formed on a region inside the three continuous slits in the patch conductor 30. In the coplanar line 31, a feeding point P connecting the patch conductor 30 and the RF circuit 40 is formed. Meanwhile, the GND pins 21 are connected to a region outside the three continuous slits in the patch conductor 30.

The RF circuit 40 is provided at the central portion on the top face of the patch conductor 30. That is, the lower face of the RF circuit 40 is attached to the top face of the patch conductor 30. The RF circuit 40 is, for example, a low-noise amplifier circuit. The RF circuit 40 is surrounded by a plurality of GND pins 21 and shielded by the plurality of GND pins 21. In other words, the plurality of GND pins 21 prevent intrusion of radio waves from the outside of the antenna device 100 into the RF circuit 40 and leakage of noise from the RF circuit 40 to the outside of the antenna device 100.

Note that the RF circuit 40 is surrounded by a plurality of GND pins 21 farthest radially outward from the center of the patch conductor 30 among the plurality of GND pins 21. A radially inner region with respect to the plurality of GND pins 21 surrounding the circumference of the RF circuit 40 in this manner is hereinafter referred to as an inner region 32.

The mounted components 41*a* and 41*b* are provided on the lower face of the substrate 10. That is, the top faces of the mounted components 41*a* and 41*b* are attached to the lower face of the substrate 10.

The signal line 42 is provided inside the substrate 10. The signal line 42 connects the RF circuit 40 and the mounted component 41*a*. Incidentally, the signal line 42 penetrates through the GND conductor 20 and the patch conductor 30 without being in contact with them. Therefore, the mounted component 41*a* can receive a signal output from the RF circuit 40 via the signal line 42.

Moreover, the signal line 42 is surrounded by a plurality of GND pins 21 and shielded by the plurality of GND pins 21. In other words, the plurality of GND pins 21 prevents intrusion of radio waves from the outside of the antenna device 100 into the signal line 42 and leakage of noise from the signal line 42 to the outside of the antenna device 100.

The power supply line 43 is provided inside the substrate 10. The power supply line 43 connects the RF circuit 40 and the mounted component 41*b*. Incidentally, the power supply line 43 penetrates through the GND conductor 20 and the patch conductor 30 without being in contact with them. Therefore, the mounted component 41*b* can supply power to the RF circuit 40 via the power supply line 43.

Moreover, the power supply line 43 is surrounded by a plurality of GND pins 21 and shielded by the plurality of GND pins 21. In other words, the plurality of GND pins 21 prevents intrusion of radio waves from the outside of the antenna device 100 into the power supply line 43 and leakage of noise from the power supply line 43 to the outside of the antenna device 100.

Next, a case where the antenna device 100 operates as a reception antenna device will be described.

First, when receiving a radio wave, the patch conductor 30 generates a high-frequency signal corresponding to the radio wave. Next, the patch conductor 30 transmits the generated high-frequency signal to the RF circuit 40 via the coplanar line 31. In this case, the RF circuit 40 amplifies the high-frequency signal and transmits the amplified high-frequency signal to the mounted component 41*a* via the signal line 42. In addition, power supply to the RF circuit 40 is performed by the mounted component 41*b* to the RF circuit 40 via the power supply line 43.

Incidentally, an arrow illustrated in FIG. 3 indicates the direction of a line of electric force L. As illustrated in FIG. 3, no current flows in the inner region 32 surrounded by the GND pins 21 since the circumference of the inner region 32 is short-circuited by the GND pins 21. That is, the inner region 32 is shielded by the GND pins 21. In the antenna device 100, the RF circuit 40, the signal line 42, and the power supply line 43 are provided in the inner region 32 surrounded by the GND pins 21. Therefore, intrusion of radio waves from the outside of the antenna device 100 into the RF circuit 40, the signal line 42, and the power supply line 43 provided in the inner region 32 is prevented.

Furthermore, the inner region 32 of the patch conductor 30 is connected to the GND conductor 20 via a plurality of GND pins 21. Therefore, the antenna device 100 can use the inner region 32 as a mounting space for the RF circuit 40.

It is based on the premise that the RF circuit 40 is used in a high-frequency band of several tens of GHz band. In the antenna device 100, in the high-frequency band, an installation face for installing the RF circuit 40 is a ground face (top face of the patch conductor 30) having a large wavelength ratio and no holes. Therefore, the antenna device 100 can reduce unnecessary coupling due to radio waves radiated from the antenna device 100 to the outside and the influence of noise from the outside of the antenna device 100.

Note that the above description of the operation of the antenna device 100 relates to a case where the antenna device 100 operates as a reception antenna device, however, the antenna device 100 can also operate as a transmission antenna device. Even in a case where the antenna device 100 operates as a transmission antenna device, it is possible to achieve an effect equivalent to that in the case where the antenna device operates as a reception antenna device.

As described above, the antenna device 100 according to the first embodiment includes: the patch conductor 30 provided on the substrate 10; the GND conductor 20 provided in the substrate 10 in such a manner as to face the patch conductor 30; the GND pins 21 that are provided in the substrate 10 and that connect the patch conductor 30 and the GND conductor 20; and the RF circuit 40 provided on a first face of the patch conductor 30 opposite to a second face of the patch conductor 30, the second face being attached to the substrate 10, the RF circuit 40 being provided in such a manner as to be surrounded by the GND pins 21. Therefore, the antenna device 100 does not require a space for installing the RF circuit 40 in a space inside the patch antenna, so that the size of the device can be reduced.

Second Embodiment

Figure 4:
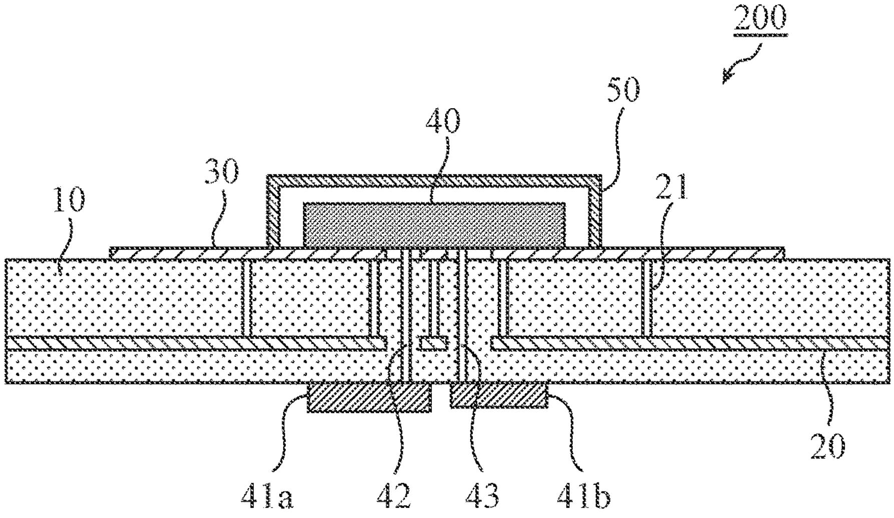
FIG. 4 is a cross-sectional view illustrating a configuration of an antenna device according to a second embodiment.

An antenna device 200 according to a second embodiment will be described with reference to FIG. 4. FIG. 4 is a cross-sectional view illustrating the configuration of the antenna device 200 according to the second embodiment.

As illustrated in FIG. 4, the antenna device 200 according to the second embodiment has a configuration in which a shielding case 50 is added to the configuration of the antenna device 100 according to the first embodiment.

The shielding case 50 is formed of a metal material. The shielding case 50 covers the circumference of the RF circuit 40. Such a shielding case 50 is electrically connected to the top face of the patch conductor 30 using, for example, solder, a conductive adhesive, or the like. That is, the shielding case 50 covers the outside of the entire RF circuit 40 with the patch conductor 30 serving as the GND. Moreover, the shielding case 50 is not electrically connected to the coplanar line 31.

Specifically, as long as the shielding case 50 covers the entire RF circuit 40, the shielding case 50 may cover the entire coplanar line 31 or partially cover the coplanar line 31. In a case where the shielding case 50 partially covers the coplanar line 31, the shielding case 50 has a cutout portion that straddles the coplanar line 31 so as not to be in electrical contact with the coplanar line 31.

The antenna device 200 can improve the shieldability of the RF circuit 40 by covering the RF circuit 40 with the shielding case 50 in the above manner. That is, the shielding case 50 prevents intrusion of radio waves from the outside of the antenna device 200 into the RF circuit 40 and leakage of noise from the RF circuit 40 to the outside of the antenna device 200.

Note that, in the antenna device 200, metal plating may be applied to the surface of the RF circuit 40 instead of including the shielding case 50. In this case, the surface of the metal-plated RF circuit 40 is short-circuited via the patch conductor 30. By metalizing the surface of the RF circuit 40 in this manner, the shieldability of the RF circuit 40 can be improved in the antenna device 200.

As described above, the antenna device 200 according to the second embodiment includes the shielding case 50 that covers the outside of the RF circuit 40 and that is connected to the patch conductor 30. Therefore, the antenna device 200 can improve the shieldability of the RF circuit 40.

Furthermore, in the antenna device 200, the surface of the RF circuit 40 is plated with metal. Therefore, the antenna device 200 can improve the shieldability of the RF circuit 40.

Third Embodiment

Figure 5:
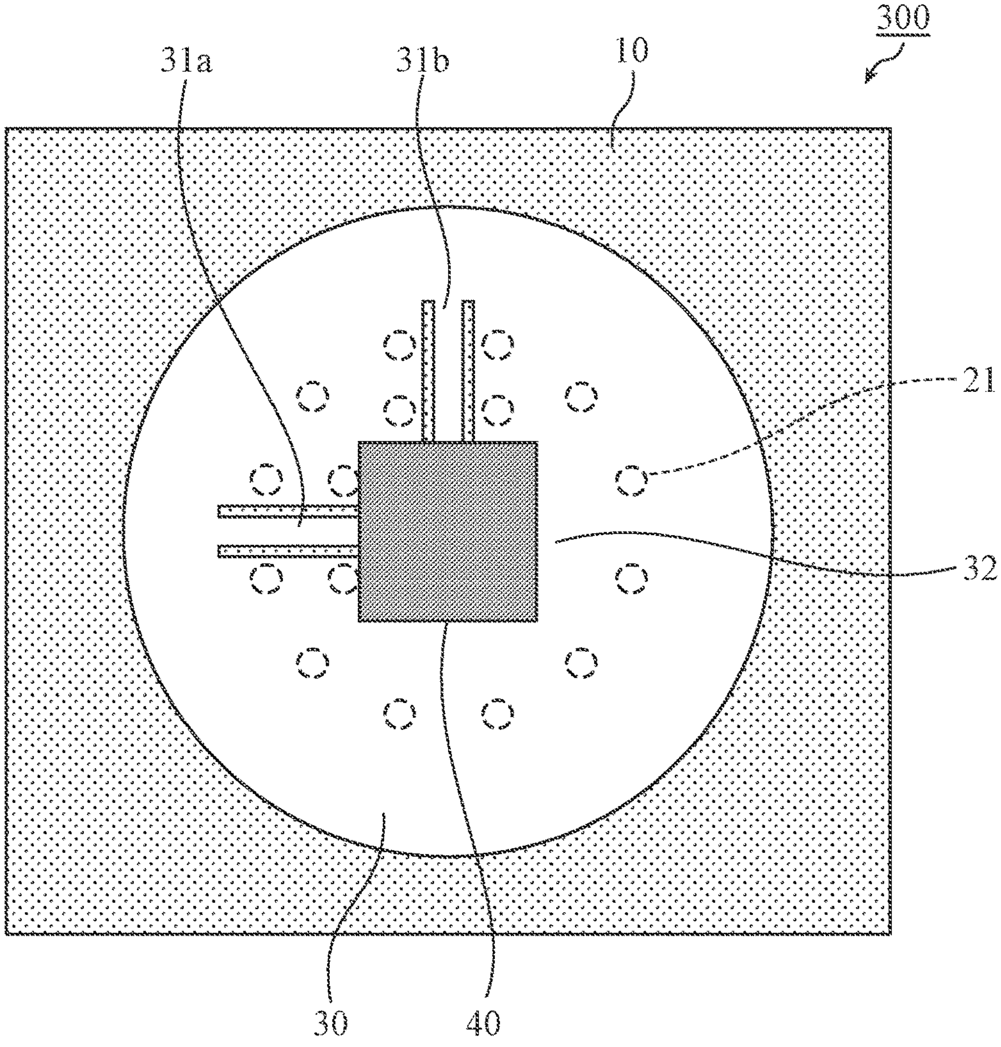
FIG. 5 is a plan view illustrating a configuration of an antenna device according to a third embodiment.

An antenna device 300 according to a third embodiment will be described with reference to FIG. 5. FIG. 5 is a plan view illustrating the configuration of the antenna device 300 according to the third embodiment.

As illustrated in FIG. 5, the antenna device 300 according to the third embodiment has a configuration that includes two coplanar lines 31*a* and 31*b* instead of one coplanar line 31 in the antenna device 100 according to the first embodiment.

The patch conductor 30 includes the coplanar lines 31*a* and 31*b*. The coplanar line 31*a* and the coplanar line 31*b* are provided in such a manner as to be perpendicular to each other. Each of the coplanar lines 31*a* and 31*b* has a feeding point P. The antenna device 300 can excite a circularly polarized wave by feeding power through the feeding points P of the coplanar lines 31*a* and 31*b* which have a phase difference of 90° therebetween as described above.

Note that the antenna device 300 may include three or more coplanar lines. In this case, in the antenna device 300, the coplanar lines can be provided at desired positions by appropriately setting the phase differences between adjacent coplanar lines.

As described above, the antenna device 300 according to the third embodiment includes two or more coplanar lines 31*a* and 31*b* that are provided for the patch conductor 30 and that connect the patch conductor 30 and the RF circuit 40. The two coplanar lines 31*a* and 31*b* are provided in such a manner as to be perpendicular to each other. Therefore, the antenna device 300 can excite a circularly polarized wave.

Fourth Embodiment

Figure 6:
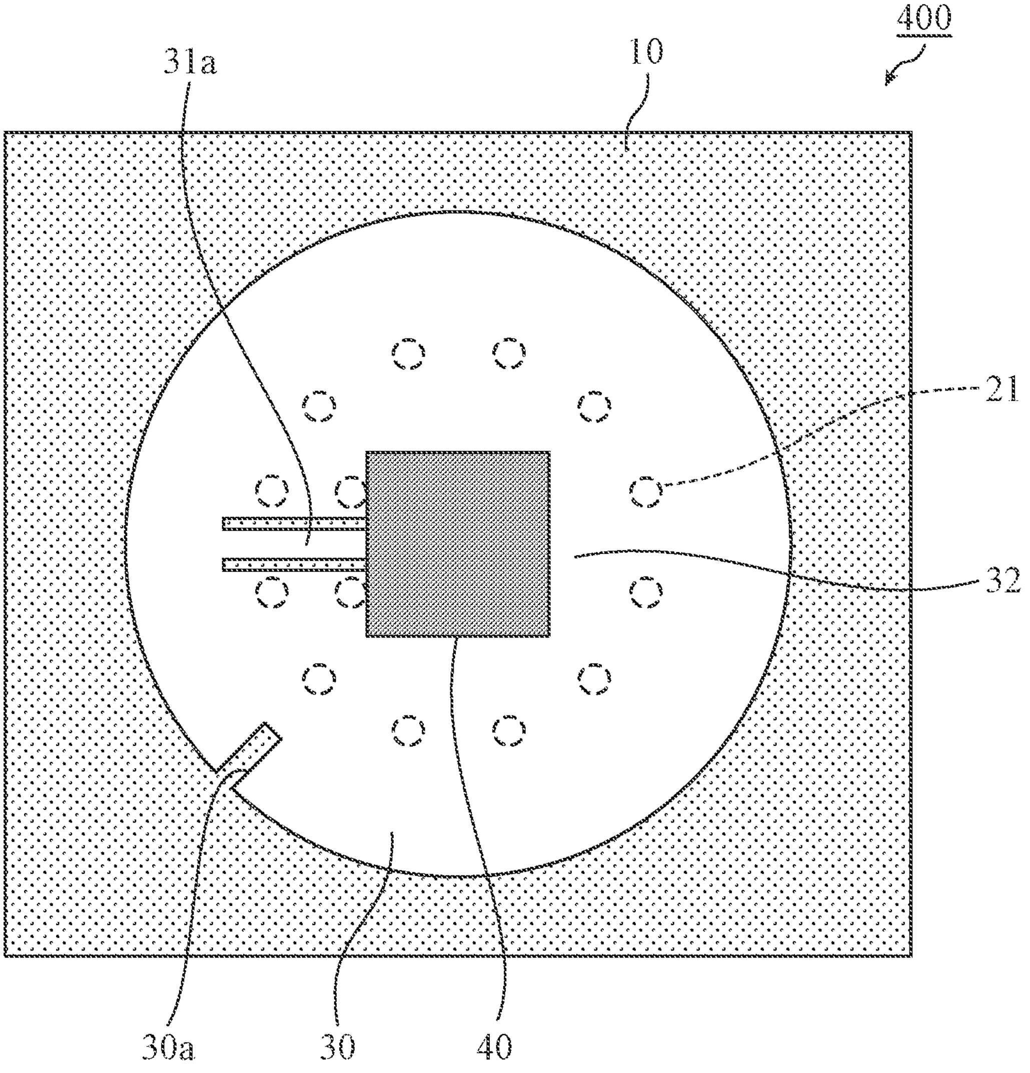
FIG. 6 is a plan view illustrating a configuration of an antenna device according to a fourth embodiment.

An antenna device 400 according to a fourth embodiment will be described with reference to FIG. 6. FIG. 6 is a plan view illustrating the configuration of the antenna device 400 according to the fourth embodiment.

The antenna device 400 according to the fourth embodiment has a configuration in which a cutout portion 30*a* is added to the configuration of the antenna device 100 according to the first embodiment.

As illustrated in FIG. 6, the patch conductor 30 has the cutout portion 30*a*. The cutout portion 30*a* is for implementing circular polarization.

As described above, the antenna device 400 according to the fourth embodiment includes the cutout portion 30*a* provided in the outer circumferential portion of the patch conductor 30. Therefore, the antenna device 400 can implement circular polarization by the cutout portion 30*a*.

Fifth Embodiment

Figure 7:
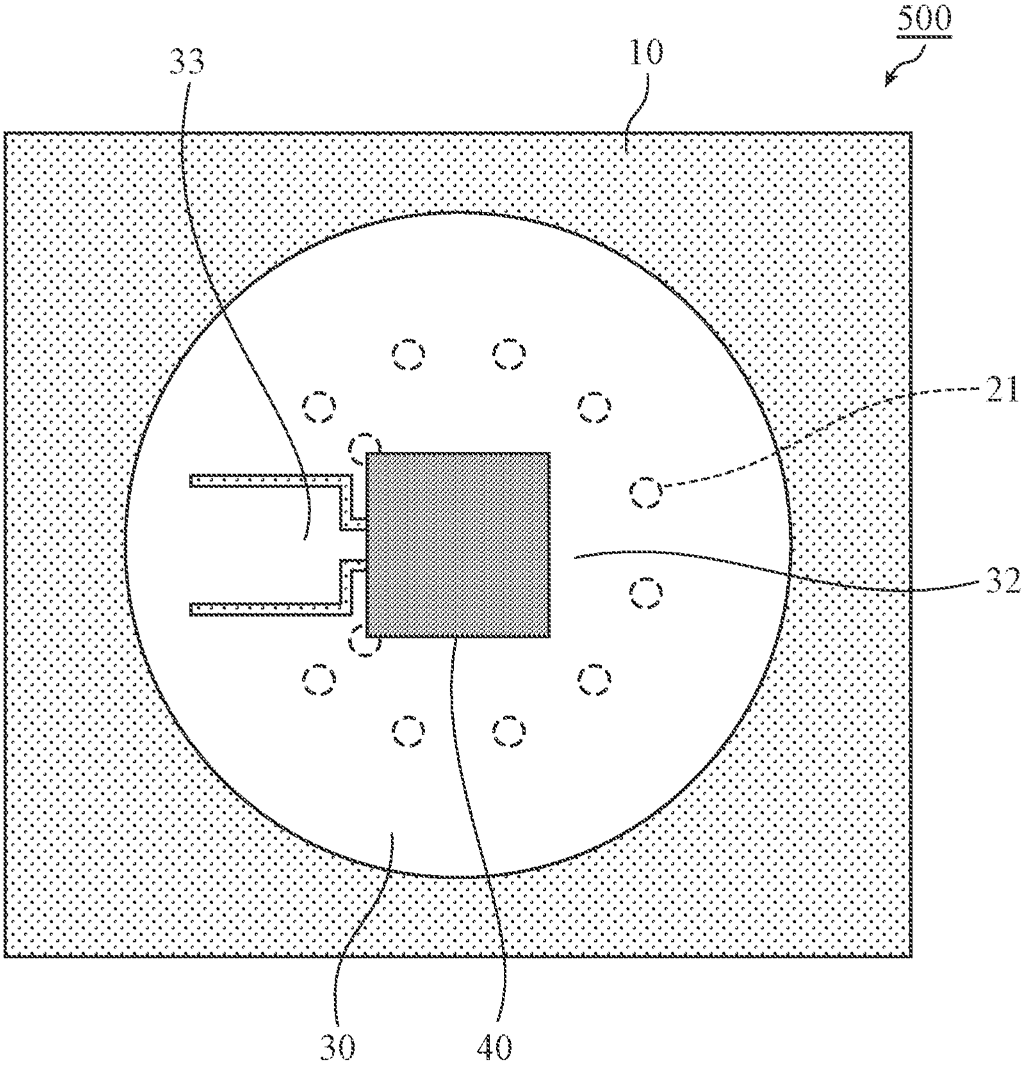
FIG. 7 is a plan view illustrating a configuration of an antenna device according to a fifth embodiment.

An antenna device 500 according to a fifth embodiment will be described with reference to FIG. 7. FIG. 7 is a plan view illustrating the configuration of the antenna device 500 according to the fifth embodiment.

The antenna device 500 according to the fifth embodiment has a configuration that includes a λ/4 conversion line 33 instead of the coplanar line 31 of the antenna device 100 according to the first embodiment.

As illustrated in FIG. 7, the patch conductor 30 includes the λ/4 conversion line 33. The λ/4 conversion line 33 is a conductor region surrounded by slits on both sides in the width direction in the patch conductor 30. The λ/4 conversion line 33 is formed into a rectangular shape in the inner portion between the slits facing each other in the patch conductor 30 as described above. The λ/4 conversion line 33 connects the patch conductor 30 and the RF circuit 40. Therefore, the λ/4 conversion line 33 facilitates impedance matching between the patch conductor 30 and the RF circuit 40 as compared with the case where the coplanar line 31 is provided.

In addition, since the line width of the λ/4 conversion line 33 can be set desirably, the value of the impedance can be selected desirably. Therefore, in the antenna device 500, it is possible to design an antenna in which the patch conductor 30 and the RF circuit 40 are set to have desired impedance values.

Note that the antenna device 500 includes the rectangular λ/4 conversion line 33, however, the shape of the λ/4 conversion line 33 is not limited thereto. The λ/4 conversion line 33 may have, for example, a tapered shape in which the line width gradually increases as it is closer to an outer side in the radial direction of the patch conductor 30. By including the tapered λ/4 conversion line 33, the antenna device 500 can reduce the influence on a reflection coefficient of a radio wave due to a steep change in the line width.

Furthermore, the antenna device 500 may include a plurality of λ/4 conversion lines 33. In this case, in the antenna device 500, the λ/4 conversion lines 33 can be provided at desired positions by appropriately setting phase differences between adjacent λ/4 conversion lines 33.

As described above, the antenna device 500 according to the fifth embodiment includes the λ/4 conversion line 33 that is provided for the patch conductor 30 and that connects the patch conductor 30 and the RF circuit 40. The λ/4 conversion line 33 is formed in such a manner that a portion closer to the outside of the patch conductor 30 has a wider line width. Therefore, in the antenna device 500, it is possible to set the patch conductor 30 and the RF circuit 40 to have desired impedance values.

Sixth Embodiment

Figure 8:
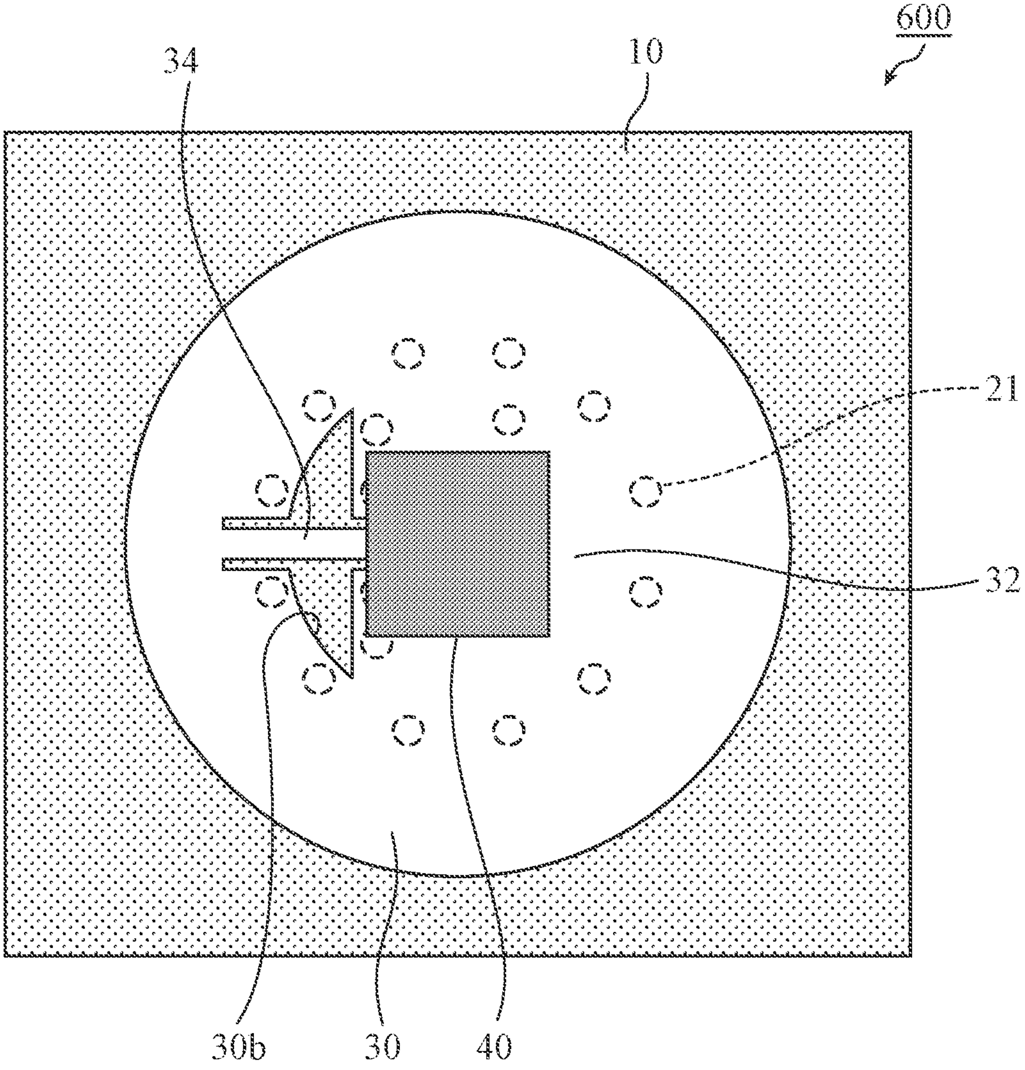
FIG. 8 is a plan view illustrating a configuration of an antenna device according to a sixth embodiment.

An antenna device 600 according to a sixth embodiment will be described with reference to FIG. 8. FIG. 8 is a plan view illustrating the configuration of the antenna device 600 according to the sixth embodiment.

The antenna device 600 according to the sixth embodiment has a configuration that includes a feed line 34 instead of the coplanar line 31 of the antenna device 100 according to the first embodiment.

As illustrated in FIG. 8, the patch conductor 30 includes the feed line 34. The feed line 34 is a conductor region that is a portion remaining after cutting out parts of the patch conductor 30. Two portions obtained by cutting out the parts from the patch conductor 30 are hollow portions 30*b*. Furthermore, a part of the feed line 34 forms a microstrip line. As described above, a part of the feed line 34 is a microstrip line, and thus impedance matching between the patch conductor 30 and the RF circuit 40 is easily achieved by providing a stub in the feed line 34, for example.

Note that the antenna device 600 may include a plurality of feed lines 34. In this case, in the antenna device 600, the feed lines 34 can be provided at desired positions by appropriately setting phase differences between adjacent feed lines 34.

As described above, the antenna device 600 according to the sixth embodiment includes the feed line 34 that is provided for the patch conductor 30 and that connects the patch conductor 30 and the RF circuit 40. The feed line 34 is formed by cutting out parts of the patch conductor 30. Therefore, in the antenna device 600, the values of impedance can be easily matched between the patch conductor 30 and the RF circuit 40.

Note that the present disclosure can include a flexible combination of the embodiments, modification of any component of the embodiments, or omission of any component in the embodiments within the scope of the disclosure.

INDUSTRIAL APPLICABILITY

Since an antenna device according to the present disclosure includes an RF circuit provided in such a manner as to be surrounded by GND pins, a space for installing the RF circuit is not required in a space inside the patch antenna, so that the size of the device can be reduced. Therefore, the antenna device is suitable for use as an antenna device or the like.

REFERENCE SIGNS LIST

10: substrate, 20: GND conductor, 21: GND pin, 30: patch conductor, 30*a*: cutout portion, 30*b*: hollow portion, 31, 31*a*, 31*b*: coplanar line, 32: inner region, 33: λ/4 conversion line, 34: feed line, 40: RF circuit, 41*a*, 41*b*: mounted component, 42: signal line, 43: power supply line, 50: shielding case, 100 to 600: antenna device, P: feeding point, L: line of electric force

The invention claimed is:

1. An antenna device comprising:

a patch conductor provided on a substrate;

a GND conductor provided in the substrate in such a manner as to face the patch conductor;

GND pins that are provided in the substrate and that connect the patch conductor and the GND conductor; and an RF circuit provided on a first face of the patch conductor opposite to a second face of the patch conductor, the second face being attached to the substrate, the RF circuit being provided in such a manner as to be surrounded by the GND pins.

2. The antenna device according to claim 1, further comprising:

a shielding case that covers an outside of the RF circuit and that is connected to the patch conductor.

3. The antenna device according to claim 1, wherein a surface of the RF circuit is plated with metal.

4. The antenna device according to claim 1, further comprising:

two or more coplanar lines that are provided for the patch conductor and that connect the patch conductor and the RF circuit, wherein the two coplanar lines are provided in such a manner as to be perpendicular to each other.

5. The antenna device according to claim 1, further comprising:

a cutout portion provided in an outer circumferential portion of the patch conductor.

6. The antenna device according to claim 1, further comprising:

a λ/4 conversion line that is provided for the patch conductor and that connects the patch conductor and the RF circuit, wherein the λ/4 conversion line is formed in such a manner that a portion closer to an outside of the patch conductor has a wider line width.

7. The antenna device according to claim 1, further comprising:

a feed line that is provided for the patch conductor and that connects the patch conductor and the RF circuit, wherein the feed line is formed by cutting out a part of the patch conductor.

* * * * *